May 8, 1956 E. B. SEVETZ, SR 2,744,547
TILTING BAND SAW MACHINE
Filed Jan. 3, 1955 4 Sheets-Sheet 1

INVENTOR
EDWARD BRUCE SEVETZ, SR
BY Chapin & Neal
ATTORNEYS

May 8, 1956  E. B. SEVETZ, SR  2,744,547
TILTING BAND SAW MACHINE
Filed Jan. 3, 1955  4 Sheets-Sheet 3

INVENTOR.
EDWARD BRUCE SEVETZ, SR.
BY Chapin & Neal
ATTORNEYS

May 8, 1956  E. B. SEVETZ, SR  2,744,547
TILTING BAND SAW MACHINE
Filed Jan. 3, 1955  4 Sheets-Sheet 4
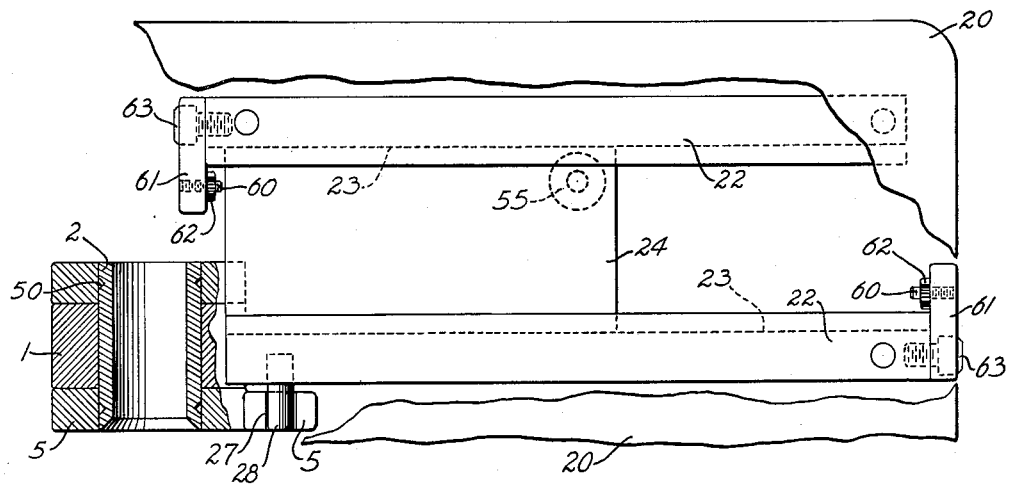
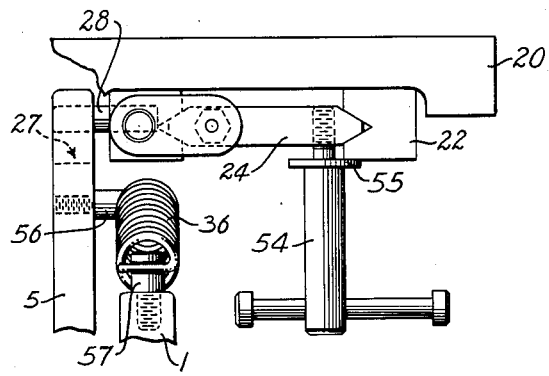
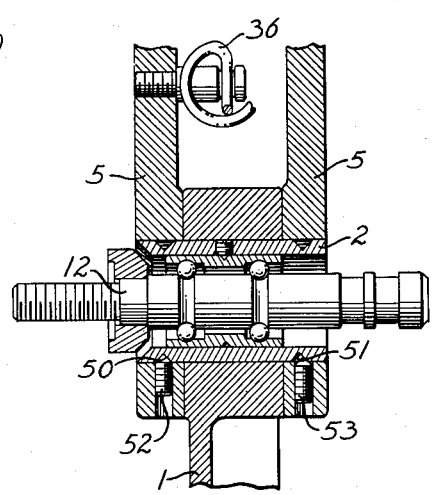
*INVENTOR.*
EDWARD BRUCE SEVETZ, SR.
BY Chapin & Neal
ATTORNEYS United States Patent Office 2,744,547
Patented May 8, 1956

2,744,547

TILTING BAND SAW MACHINE

Edward Bruce Sevetz, Sr., West Hartford, Conn., assignor to Hampden Brass and Aluminum Company, Springfield, Mass., a corporation of Massachusetts Application January 3, 1955, Serial No. 479,429

8 Claims. (Cl. 143—24)

This invention relates to an improvement in tilting band-saw machines.

The principal object of the invention is to provide improved means for moving the work table of the machine horizontally to maintain the saw opening therein in position for the passage of the saw in all positions of angular adjustment of the saw band.

Tilting band-saw machines commonly include a C frame, the lower arm of which is pivoted adjacent its free end to a fixed base. One or more saw band supporting wheels are carried by the frame and another saw band supporting wheel is carried by the base and mounted for rotation about the axis of the pivotal connection between the frame and base. A saw band is trained around the several wheels with the cutting run of the saw band extending across the opening between the arms of the C frame. A work table is positioned between the arms of the frame and is provided with an opening for the passage of the saw band at the point where the latter intersects the plane of the table. It is desirable that the work table be horizontal in all angular positions of the saw band if angular cuts are to be made and it is desirable that the table be automatically maintained horizontal as the saw frame is tilted. As is apparent, if the work table remains horizontal the point of intersection of the saw band and table shifts in the direction of pivotal movement of the frame as the frame is tilted to move the cutting run of the saw band from a vertical to an inclined position and that the work table must therefore be moved to cause the saw band opening therein to follow the movement of the saw band. Many proposals have been made to accomplish this including various linkages, cams and gear arrangements which impart a reciprocal or planetary movement to the table as the frame is tilted. Such proposed arrangements are relatively complicated, and are expensive to manufacture and to maintain.

It is a specific object of the present invention to automatically reciprocate the work table in conformity with the movement of the point of intersection of the saw band and table by a simple pin and right line slot connection directly connecting the table and frame. Broadly this is accomplished according to the present invention by mounting the table on the fixed base for horizontal reciprocation, so arranging the pin and right line slot connection that the rate of horizontal movement of the point of contact of the pin and right line slot is substantially constant during angular movement of the frame and so positioning such point of contact on a radiant drawn through such point and the axis of pivotal movement of the frame, that, for a given angular movement of the radiant, the extent and rate of movement of the point of contact substantially equals that of the saw opening in the table. To maintain the rate of movement of the point of contact between the pin and right line slot constant during angular movement of the frame the slot must be directed to substantially maintain the driving point of contact on the given radiant. If the right line slot is carried by the tilting frame and the pin by the table the slot will be directed radially of the tilting movement of the frame, and if the slot is carried by the table it will be directed at right angles to the plane of the table.

Other and further objects, residing in the details of construction and the preferred location of the pin and right line slot connection, will be made apparent in the disclosure of the accompanying drawings and the following specification and claims.

This application is a continuation in part of my co-pending application Serial No. 415,548, filed March 11, 1954 and forfeited.

In the accompanying drawings,

Fig. 5 is a fragmentary plan view showing a modified stop arrangement;

Fig. 6 is an end view of the arrangement of Fig. 5 looking from the left of Fig. 5, and Fig. 7 is a vertical sectional view through the pivotal connection of the frame and base showing a modified arrangement.

Figure 2:
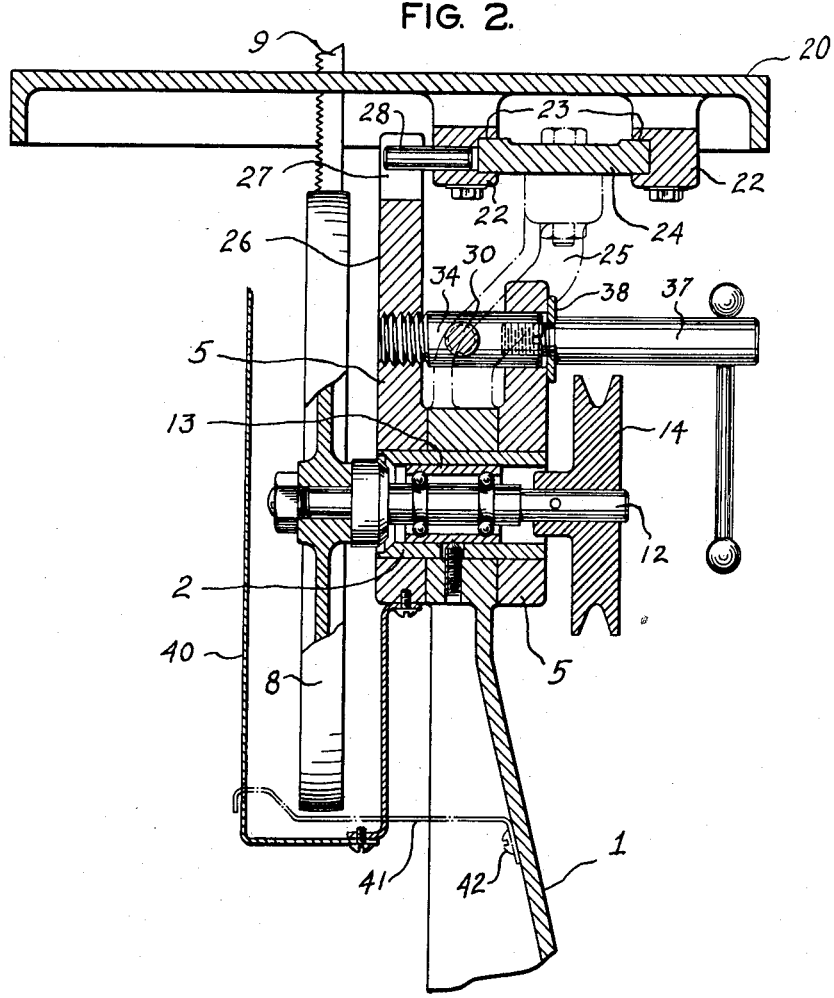
Fig. 2 is a sectional view, on a larger scale, substantially on line 2—2 of Fig. 1.

Referring to the drawings, the band-saw machine as shown includes a fixed base 1 pivotally supporting, by means of a sleeve 2 (Fig. 2), a C frame 3 having upper and lower arms 4 and 5 connected by a central portion 6. Spaced upper and lower band wheels shown in broken lines at 7 and 8, are respectively journaled in upper arm 4 and base 1. A flexible saw band 9 is tensioned around wheels 7 and 8 and preferably around a small wheel 10 journaled in the central portion 6 of the C frame. Any suitable form of resilient wheel adjusting device 11 is provided to move the wheel 7 toward and away from the wheel 8 for adjustment of the tension of the band 9.

The lower wheel 8 is mounted on a shaft 12, journaled in a bearing 13 (Fig. 2) set in pivot sleeve 2. Shaft 12 is provided with a pulley 14 from which wheel 8 and the saw band 9 are driven by a belt 15 from a motor 16 or other suitable source of power.

A work table generally indicated at 20 is provided with an opening 21 through which the cutting run of the saw band passes. Bolted or otherwise secured to the underside of the table 20 are rails 22, formed with opposed guideways 23. The guideways slidably engage the opposite edges of a supporting member 24, fixed to a bracket 25 extending from the base 1. An extension 26 from the lower arm 5 of the tilting frame extends upwardly adjacent one of the rails 22. The extension 26 is formed with a slot 27 extending radially of the axis of rotation of frame 3 and wheel 7. A pin 28 is fixed in the side of the adjacent rail 22 and extends into the radial slot 27. Thus when frame 3 is tilted from the vertical full line position of Fig. 1 to the tilted dotted line position shown in that figure, or to any intermediate angle of tilt, the table 2 is reciprocated on the fixed supporting member 24 in conformity with the movement of the frame so that opening 21 in the table is maintained in alignment with the saw band passing through it. The depth or length of slot 27 and the position of pin 28 relative to the surface of the table is made such that the outer end of extension 26 clears the underside of the table and the pin 28 remains in the slot at both extremes of movement permitted frame 3.

Tilting movement may be imparted to frame 3 in any suitable manner as by a screw link 30 provided at one end with a hand wheel 31 and rotatably mounted in a bearing 32 swivelled to the fixed base 1. Axial movement of the link 30 in the bearing 32 is prevented by collars 33 fixed to the link at opposite sides of the bearing. The other end of the link 30 is threaded through a nut 34 which is threaded or otherwise mounted for swivel movement in arm 5 of frame 3. Collars or check nuts 35 carried by link 30 on opposite sides of nut 34 form stops which limit the travel of the link in nut 34. As will be apparent rotation of link 30 by its hand wheel 31 will tilt frame 3 and the parts carried thereby between the limits defined by the stops 35 which thus prevent tilting of frame 3 beyond a predetermined angle and escape of pin 28 from the slot 27. Preferably the weight of frame 3 is in part counter-balanced in its tilted positions in any suitable manner as by tension spring 36 connected between frame 3 and member 24 of the fixed base 1.

Preferably means are provided to lock the frame in desired tilted position, the means shown for that purpose comprising a shouldered pin 37 (Fig. 2) having a reduced end, carrying a washer 38, and threaded into the end of nut 34, by which nut 34 may be clamped against swivel movement.

Preferably also the tilting frame 3 is provided with a protective housing 40. To indicate the angle of tilt of the saw band a pointer 41 is fixed, as by a screw 42 to the fixed base 1. Pointer 41 extends through an arcuate opening 43 (Fig. 1) formed in housing 40 and the latter is provided adjacent opening 43 with indicia 44 showing the angle at which the cutting run of the saw is tilted.

The driving point of pin 28 and right line slot 27 can be located on any radiant of the frame through the axis of the wheel, but for a given height of the surface of the table above the center of wheel 8, which is the center of tilting movement of the frame, there is only one location of the pin on the given radiant which will substantially conform the horizontal movement of the table to the movement of the point of intersection of the saw band and table.

Figure 3:
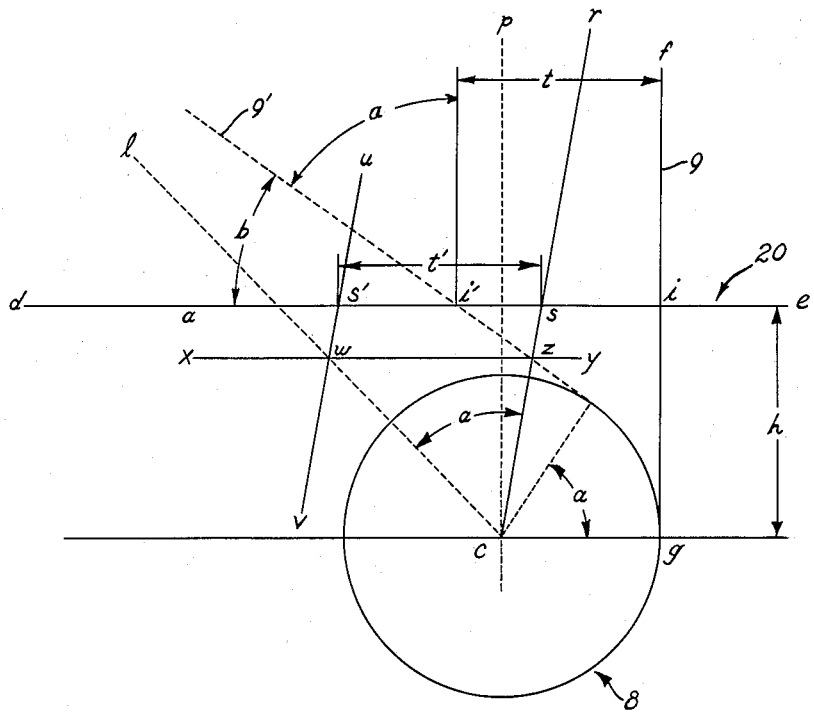
Fig. 3 is a diagrammatic view showing the manner of locating the driving pin.

In the diagrammatic illustration of Fig. 3 the plane of the surface of the table 20 is indicated by the line $d$—$e$, its height above the center $c$ of wheel 8 is indicated at $h$ and the cutting run of the saw band 9 is indicated by line $f$—$g$, the saw band being at right angles to the table and intersecting the latter at $i$. Let $r$—$c$ be any given radiant of the frame through $c$ upon which it is desired to locate the driving point of contact of the pin and slot connection between the frame and table, $s$ being the point at which the selected radiant intersects the plane of the table. Let $a$ be the given angle through which the frame and saw band is to tilt to bring the latter to the desired angle $b$ with the table, as indicated at 9'. The point of intersection of the saw band in its so-tilted position is indicated at $i'$ and the distance traveled from $i$ to $i'$ by the point of intersection of the saw band and table in such tilting movement is shown at $t$. To determine the location on radiant $r$—$c$ of the driving point of the pin and slot connection between the frame and table, a radial line $l$—$c$ is drawn at the given angle $a$ to the radiant $r$—$c$ in the direction of the tilting movement of the frame and a line $u$—$v$ is drawn parallel to the given radiant $r$—$c$ through a point $s'$ on the table spaced from point $s$, in the direction of the tilting movement of the frame, a distance $t'$ equal to $t$. From the point of intersection $w$ of line $u$—$v$ and $l$—$c$ a line $x$—$y$ is drawn parallel to the plane of the table and the point of intersection of line $x$—$y$ with the given radiant $r$—$c$ gives the point $z$ at which the point of driving contact of the pin and slot connection should be located. For practical purposes $z$ may may be considered the center of the pin. Since the driving point of contact of the pin is spaced from its center by a radius of the pin and the point of contact of the pin with the slot travels over an arc of the pin circumference as the frame tilts, there is a slight disconformity between the rate of movement of the intersection $i$ and the actual table movement but this is extremely slight and in practice is easily compensated for by the width of the slot in the table.

Preferably, and as shown, the pin is carried by the table and the right line slot is carried by the frame on a radiant of movement of the latter. Less desirably the right line slot could be carried by the table if directed at right angles to the surface thereof, the pin being carried by the frame. The arcuate path of travel by the pin, when carried by the frame in a given arc of movement of the frame, would increase the variation in the rate of travel of the table relative to the travel of the intersection $i$. But this can be compensated for by a further increase in the width of the slot in the table which in some circumstances might not be found objectionable.

Preferably also to minimize the necessary length of the slot 27 and to place the connection a minimum distance below the table the radiant chosen is such that the predetermined angle $a$ between the radiant $r$—$c$ and radial line $l$—$c$ is bisected by a perpendicular through the center $c$ of the pivotal connection between the frame and base. This relationship, using a predetermined angle of movement of 45° which makes angles $a$ and $b$ equal, is that shown in Figs. 1 and 2 and diagrammatically illustrated in Fig. 4 using the same angular and lineal designations as in Fig. 3.

Figure 4:
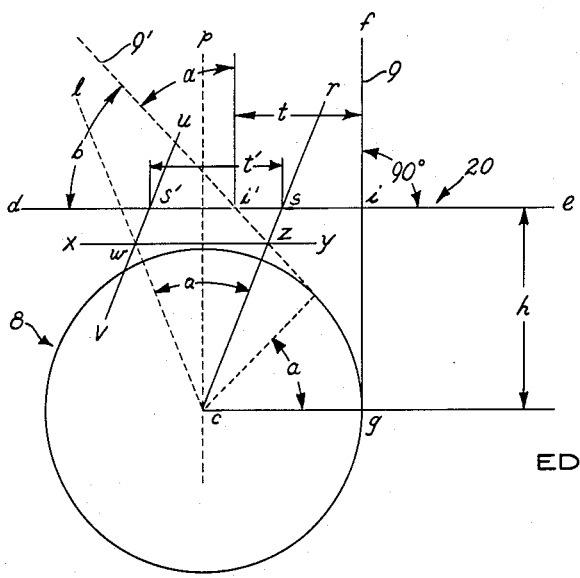
Fig. 4 is a diagrammatic view similar to Fig. 3 and showing the relationships of Fig. 3 as applied to the preferred location of the frame radiant on which the driving pin is positioned.

In Fig. 4 the perpendicular through the center of pivotal movement is shown at $p$—$c$ and bisects the predetermined 45° angle between the lines $r$—$c$ and $l$—$c$, the location $z$ of the pin 28 on the radiant being located in the manner described in connection with Fig. 3.

For small band saws intended for home use the screw link 30 and its associated driving and driven parts may be omitted and the saw swung to desired position by grasping the frame 3, or table 20, and moving the frame and saw band to the desired angle of tilt. When the screw 30 or other positive driving means is omitted it may be desirable to impose a measure of frictional resistance to the pivotal movement of the frame beyond that afforded by the usual bearing tolerances and the frictional resistance of the table in the guide ways 22.

Figure 1:
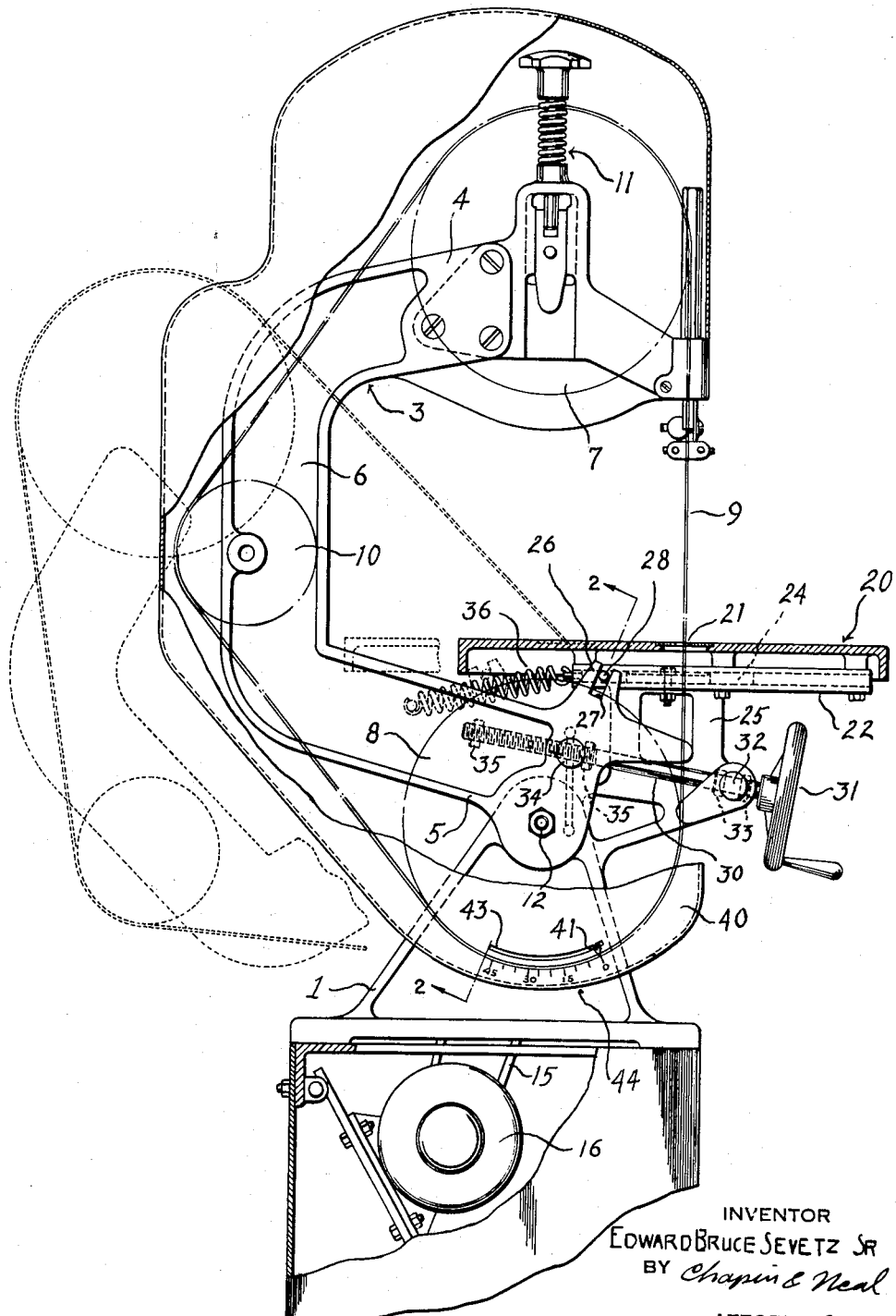
Fig. 1 is a side elevational view, parts being broken away, of a band-saw embodying the invention.

As shown in Figs. 5, 6 and 7 the sleeve 2 of the pivotal connection between the frame arms 5 and base 1 is provided with beveled grooves 50 and 51 in which the tapered ends of respective set screws 52 and 53, threaded in the arms 5, are adapted to engage. One of the set screws, as 53 is offset from its groove so as to draw the opposite arm 5 against the base 1 imposing a measure of friction between the arm and base. As will be understood the measure of friction needed is only sufficient to afford a smooth movement of the frame from one position to another by the hand after which the frame is locked in position by clamp screw 54 threaded into the table support 24 and having a flange 55 which engages the adjacent guide rail 22. With screw link 30 of Fig. 1 removed the counterbalancing spring 36 is conveniently connected between a pin 56 threaded in arm 5 below pin 28 and a pin 57 threaded into the base 1 approximately where bearing 32 of screw link 30 was located. In the form of Fig. 1 stop means for limiting the tilting of the frame are shown provided on the screw link 30, as above described. In Figs. 5 and 6 stops for the same purpose are shown in the form of pins 60 threaded into members 61 extending from opposite ends of guide rails 22, in position to respectively engage the ends of the fixed support 24 when the table and its guide rails 22 are at the extremes of their reciprocation. The pins are held in adjusted position in the members 61 by nuts 62 and members 61 are secured to the ends of rails 22 by machine bolts 63. If it is desired to remove the table or to overshift it bolts 63 may be loosened and members 61 with stop pins 60 swing out of alignment with support 24.

What is claimed is:

1. In a band saw machine including a base, a frame pivotally connected to the base, at least one saw band supporting wheel rotatably carried by the frame, a saw band supporting wheel rotatably carried by the base and mounted for rotation about the axis of said pivotal connection, and a saw band trained around said wheels; a horizontal work table having an opening for the passage of the cutting run of the saw band, said table being mounted on the base for horizontal reciprocation, a pin and slot connection between the frame and table, said slot being directed to substantially maintain the driving point of contact between the pin and slot on a given radiant (proceeding from said axis) of the frame, said point in a given position of the frame being located on said radiant at the intersection of said radiant by a line drawn parallel to the plane of the table from the point at which a radial line, refining with the radiant a predetermined angle of pivotal movement of the frame from said given position, is intersected by a line drawn parallel to said radiant through a point on the table spaced from the intersection of the radiant with the plane of the table, in the direction of the angular movement of the frame, a distance equal to the distance traveled by the point of intersection of the saw band and table in the tilting of the saw band and frame through said predetermined angle of pivotal movement.

2. In a band saw machine including a base, a frame pivotally connected to the base, at least one saw band supporting wheel rotatably carried by the frame, a saw band supporting wheel rotatably carried by the base and mounted for rotation about the axis of said pivotal connection, and a saw band trained around said wheels; a horizontal work table having an opening for the passage of the cutting run of the saw band, said table being mounted on the base for horizontal reciprocation, a radially directed slot formed in the frame and lying on a given radiant (proceeding from said axis) of the frame, a pin fixed to the table and engaging in said slot, said pin in a given position of the frame being located on said radiant at the intersection of said radiant by a line drawn parallel to the plane of the table from the point at which a radial line, defining with the radiant a predetermined angle of pivotal movement of the frame from said given position, is intersected by a line drawn parallel to said radiant through a point on the table spaced from the intersection of the radiant with the plane of the table, in the direction of the angular movement of the frame, a distance equal to the distance traveled by the point of intersection of the saw band and table in the tilting of the saw band and frame through said predetermined angle of pivotal movement.

3. A band saw machine as in claim 1 in which the predetermined angle of movement defined by said radiant and said radial line is bisected by a vertical through the center of pivotal movement of the frame.

4. A band saw machine as in claim 2 in which the predetermined angle of movement defined by said radiant and said radial line is bisected by a vertical through the center of pivotal movement of the frame.

5. A band saw machine as in claim 2 having a spring to, in part at least, counterbalance the frame in its pivotal movement and stop members limiting the degree of angular movement permitted the frame in both directions.

6. A band saw machine as in claim 5 provided with means to apply sufficient friction to the pivotal connection between the frame and base to retain the frame at any given angle of tilt within the permitted limits and means to releasably clamp the frame against pivotal movement.

7. A band saw machine as in claim 2 having a screw link rotatably and pivotally connected adjacent its opposite ends respectively to the base and frame, one of said connections being threaded, and a hand wheel carried by said link for rotating said link and tilting the frame about its pivotal connection to the base.

8. A band saw machine as in claim 5 having a screw link rotatably and pivotally connected adjacent its opposite ends respectively to the base and frame, one of said connections being threaded, and a hand wheel carried by said link for rotating said link and tilting the frame about its pivotal connection to the base, said stop members being carried by said link.

References Cited in the file of this patent
UNITED STATES PATENTS

| | | |
|---|---|---|
| 797,321 | Rishebarger | Aug. 15, 1905 |
| 814,652 | Harrold et al. | Mar. 6, 1906 |